UNITED STATES PATENT OFFICE.

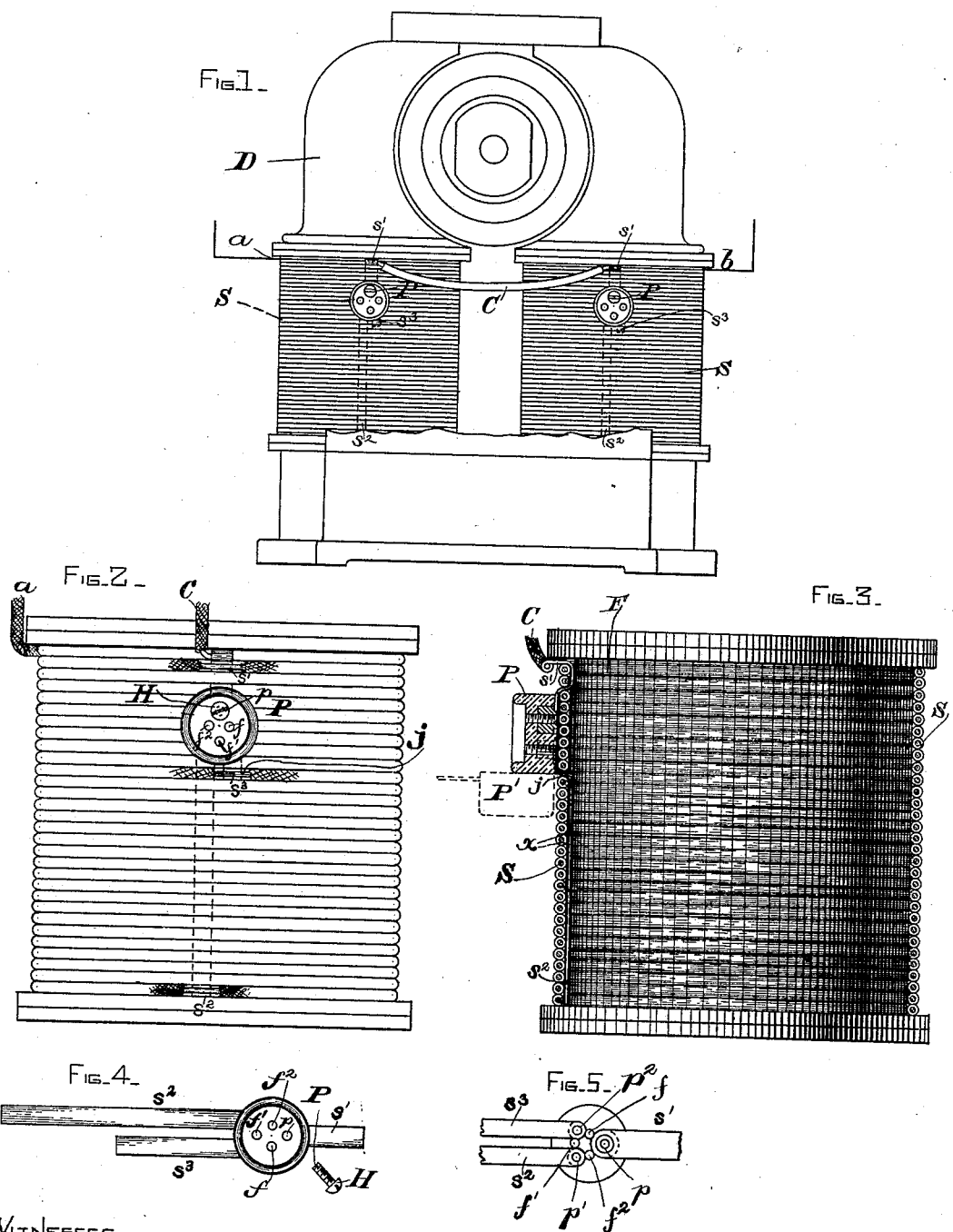

HENRY G. REIST AND JONATHAN P. B. FISKE, OF LYNN, MASSACHUSETTS, ASSIGNORS TO THE THOMSON-HOUSTON ELECTRIC COMPANY, OF CONNECTICUT.

CONNECTOR FOR DYNAMO-ELECTRIC MACHINES.

SPECIFICATION forming part of Letters Patent No. 508,636, dated November 14, 1893.

Application filed July 3, 1891. Serial No. 398,323. (No model.)

*To all whom it may concern:*

Be it known that we, HENRY G. REIST and JONATHAN P. B. FISKE, citizens of the United States, residing at Lynn, in the county of Essex and State of Massachusetts, have invented a certain new and useful Improvement in Connectors for Dynamo-Electric Machines, of which the following is a specification.

The invention consists in an improved arrangement of the connections for the regulating coils or rheostatic coils upon the field magnets of dynamos and motors, and is especially designed to be used in connection with the field magnet coils of motors or dynamos when provided with an outer layer of German silver wire which enables an adjustment of the field resistance to be effected in a comparatively short length of conductor by including a greater or less length of this conductor in the field winding.

The object of the present invention is to provide a simple and readily operated means for adjusting the length of this rheostatic winding and consequently the resistance of the field circuit so as to give the motor a definite speed when connected to a circuit at a given potential, or to adjust the dynamo (shunt-wound) to a definite voltage with a given speed.

The invention embodies certain features of mechanical construction which give advantages over those forms hitherto employed in that it is more compact, cheaper to construct, has a neat appearance, and is less liable to injury and accidental improper connections.

In the accompanying drawings, Figure 1 is an end elevation of a motor or dynamo showing the improved connecting device in place. Figs. 2 and 3 are respectively side and sectional views of the connecting device applied to the field magnet coils. Figs. 4 and 5 are detail views of the connection block.

Fig. 1 shows the invention applied to both field magnets of a motor or dynamo. It might, however, be applied to a single field magnet coil where a large capacity for regulation is not required.

D represents the iron core of the machine; F the field magnet core winding of copper wire; S the outer layer of wire which is of German silver; $a$, $b$ the wires leading to the brushes of a shunt-wound machine, and C the cable connecting the field windings F, F, while P is the insulating rosette which receives the terminals of the connecting strips shown in dotted lines, and more clearly shown in the succeeding figures.

In Figs. 2 and 3 is illustrated the manner of applying the invention to the field coils. Connections are shown to three points in the length of the winding, but it is evident that the number of connections may be diminished or increased if desired according to the degree of regulation required. The rosette or connection block P, Fig. 3, is made of hard rubber or other suitable insulating material and has attached to it three copper strips $s'$, $s^2$, $s^3$, Figs. 2, 4, and 5. These strips are soldered or secured by rivets to metallic plugs $p$, $p'$, $p^2$, Fig. 5, which are retained in position in holes in the rosette P. Two of the strips $s^2$, $s^3$, are made of copper so thin as to be quite flexible, while the other $s'$ is made of thicker and stiffer or more rigid metal and affords a rigid support for the insulating block P. Screw holes $f$, $f'$, $f^2$, are tapped into the insulating rosette P and the metallic plugs $p$, $p'$, $p^2$, so that a screw, as H, Fig. 4, inserted therein may connect any two of the strips $s'$, $s^2$, $s^3$. One of the copper strips as $s^2$ may be connected to the German silver coil at the point or near the point where it joins the copper wire of the field magnet coil. Another of the copper strips as $s^3$ may connect at any desired point farther along in the German silver coil S, say at one third of its length, from its connection with the wire C and the other copper strip, $s'$, which is the heavier portion passes under the rest of the winding and connects with the terminal of the other field magnet winding. The device is attached as follows: When sufficient copper wire has been wound upon the iron field magnet core, the end of the German silver wire is attached and at this point or near this point the end of the strip $s^2$ is bent around the bared wire and soldered. The winding of the German silver wire is then continued over the strip $s^2$ until the point $j$, Fig. 2, is reached, which may be at any point desired in the length of this winding when the wire is again bared of its insulation and the end of the strip $s^3$ is secured thereto in the same manner as before. The winding is again continued over both of the strips $s^2$, $s^3$ until the insulating rosette P is reached and then the strips are bent at a right-angle, as shown in dotted lines at $p'$, Fig. 3, in order that the winding may pass under the rosette. When the winding has been continued the width of the rosette P, the rosette is bent down again into the position shown and the winding is completed over the strip $s'$ which passes out under the wire and is secured to the terminal of the wire from the other field magnet. It will now be seen that when the screw H is inserted in the hole in the metal plug $p$, all of the German silver wire is in series with the copper winding of the magnet; that when the screw H is in the hole $f$ one-third of the German silver winding of the magnet is short-circuited, by the strips $s^3$ and $s'$ so connected; that when the screw H is in the hole $f'$ two-thirds of the rheostatic winding of German silver, i. e., that portion between the points $s^2$ and $s^3$ is short-circuited; and that when the screw H is inserted in the hole $f^2$ all of the German silver wire, or high resistance coil, is short-circuited or shunted, so that none of its resistance is added to that of the copper winding of the magnet. The other magnet or magnets of the field system may be provided with the same arrangement so that any desired amount of resistance may be added to or deducted from the field circuit.

It will be evident that the device is very readily applied to any form of magnet for varying the resistance of its winding by changing the position of the screw H and that the strips $s'$, $s^2$, $s^3$, can be thoroughly and easily insulated from the coils of wire passing under and above them; thus, mica sheets can be placed upon both sides of the strips as indicated at $x$ in Fig. 3, and the coils wound in place as shown securing the parts in position.

It is obvious that the described arrangement of the connection block and strips is applicable to any coil whether of a magnet or not, where a portion or layer of the coil is divided into sections which are to be variously connected. Furthermore the conductors need not necessarily be used only to short-circuit portions of the coil for they may serve to effect any desired connection to the same.

The invention may also be carried out, and some of its results, as to neatness and simplicity of construction may be obtained, by connecting the several strips $S'$, $S^2$, $S^3$ to points of the coil directly under them, and in this case the overlying coil or cover may be either of insulated wire, or cord or tape, wound so as to bind the strips in place.

We claim—

1. The combination with a coil having its outer layer or layers divided into sections, of connecting strips attached to said sections and running to a common point, on the field magnet winding, a connection block at said point to which said strips are attached, and means for connecting any two of said strips, substantially as described.

2. The combination with a coil provided with an outer layer or layers of higher resistance, of conductors extending immediately beneath the resistance coils and connected to said coils at different points, a connection block to which said conductors are secured, and means for connecting any two of said strips, substantially as set forth.

3. The combination with a coil having one or more outer layers of higher resistance, and divided into sections, of connecting strips running under said layers and attached to said sections, and a connection block, supported by said strips adjacent to said coil, substantially as described.

4. The combination with a coil having the inner layers F and the outer layer or layers S, of strips $s'$, $s^2$, $s^3$ running between said layers F and S, an insulating rosette P attached to and supported by said strips, and containing plugs to which said strips are connected, and means for connecting any two of said plugs, substantially as described.

5. The combination with a coil having its outer layer or layers divided into sections, of connecting strips attached to said sections and running to a common point on the field magnet winding, a suitable wrapping holding such connectors in place, an insulating connection block lying against the outer surface of the field magnet, and attached to the ends of the strips, and means for connecting the ends of said strips, substantially as described.

In witness where of we have hereto set our hands this 30th day of June, 1891.

HENRY G. REIST.
JONATHAN P. B. FISKE.

Witnesses:
ELIHU THOMPSON,
JOHN W. GIBBONEY.